US012403698B2

(12) United States Patent
Shirono

(10) Patent No.: US 12,403,698 B2
(45) Date of Patent: Sep. 2, 2025

(54) TANK

(71) Applicant: BROTHER KOGYO KABUSHIKI KAISHA, Nagoya (JP)

(72) Inventor: Taichi Shirono, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/870,986

(22) Filed: Jul. 22, 2022

(65) Prior Publication Data

US 2022/0355593 A1 Nov. 10, 2022

Related U.S. Application Data

(63) Continuation of application No. 17/062,829, filed on Oct. 5, 2020, now Pat. No. 11,396,186, which is a (Continued)

(30) Foreign Application Priority Data

Jan. 19, 2015 (JP) ................................ 2015-008171

(51) Int. Cl.
*B41J 2/175* (2006.01)
*B41J 29/13* (2006.01)
(Continued)

(52) U.S. Cl.
CPC ........... *B41J 2/17523* (2013.01); *B41J 2/175* (2013.01); *B41J 2/17503* (2013.01);
(Continued)

(58) Field of Classification Search
CPC . B41J 2/01; B41J 2/175; B41J 2/17503; B41J 2/17506; B41J 2/17513;
(Continued)

(56) References Cited

U.S. PATENT DOCUMENTS 5,233,369 A 8/1993 Carlotta et al.
5,953,030 A 9/1999 Ishinaga et al.
(Continued)

FOREIGN PATENT DOCUMENTS

EP 0 78 1659 A2 7/1997
JP 7-311072 A 11/1995
(Continued)

OTHER PUBLICATIONS

Office Action (Notice of Reasons for Rejection) issued in related Japanese Patent Application No. 2015-008171, dated Oct. 30, 2018.
(Continued)

*Primary Examiner* — Anh T Vo
(74) *Attorney, Agent, or Firm* — Merchant & Gould P.C.

(57) ABSTRACT

A tank includes: a wall separating a liquid storage chamber, which stores a liquid to be supplied to a liquid consuming part, from an outside; an inlet penetrating the wall; and a liquid outflow part which allows the liquid to flow to the outside of the liquid storage chamber. The wall includes a view wall, which extends upward and downward and allows a user to visually check a liquid level in the liquid storage chamber, and a bottom wall, which defines an inner bottom surface of the liquid storage chamber by being connected to the view wall. The inner bottom surface of the bottom wall includes an inclined part which extends from at least a part of the view wall to incline downward in a direction away from the view wall.

4 Claims, 9 Drawing Sheets

Related U.S. Application Data continuation of application No. 16/543,206, filed on Aug. 16, 2019, now Pat. No. 10,792,928, which is a continuation of application No. 15/952,662, filed on Apr. 13, 2018, now Pat. No. 10,384,455, which is a continuation of application No. 15/595,238, filed on May 15, 2017, now Pat. No. 9,944,085, which is a continuation of application No. 14/996,617, filed on Jan. 15, 2016, now Pat. No. 9,649,844.

(51) Int. Cl.
*B41J 2/01* (2006.01)
*B41J 2/17* (2006.01)

(52) U.S. Cl.
CPC ....... *B41J 2/17506* (2013.01); *B41J 2/17513* (2013.01); *B41J 2/1752* (2013.01); *B41J 2/17553* (2013.01); *B41J 2/17559* (2013.01); *B41J 2/17566* (2013.01); *B41J 29/13* (2013.01); *B41J 2/01* (2013.01); *B41J 2002/1735* (2013.01); *B41J 2/17533* (2013.01); *B41J 2/1754* (2013.01)

(58) Field of Classification Search
CPC .. B41J 2/1752; B41J 2/17523; B41J 2/17533; B41J 2/1754; B41J 2/17553; B41J 2/17559; B41J 2002/1735; B41J 29/13
See application file for complete search history.

(56) References Cited

U.S. PATENT DOCUMENTS

| | | | | |
|---|---|---|---|---|
| 6,010,212 | A | 1/2000 | Yamashita et al. | |
| 6,234,615 | B1 * | 5/2001 | Tsukuda | B41J 2/17509 347/85 |
| 6,264,312 | B1 | 7/2001 | Koitabashi et al. | |
| 6,270,207 | B1 | 8/2001 | Sasaki | |
| 6,520,630 | B1 | 2/2003 | Oda et al. | |
| 6,793,330 | B2 | 9/2004 | Usui et al. | |
| 6,951,387 | B2 | 10/2005 | Carrese et al. | |
| 7,168,801 | B2 | 1/2007 | Hwang et al. | |
| 7,384,136 | B2 | 6/2008 | Takagi | |
| 7,690,777 | B2 | 4/2010 | Wada | |
| 8,529,036 | B2 | 9/2013 | Kodama et al. | |
| 8,950,853 | B2 | 2/2015 | Nozawa et al. | |
| 9,079,413 | B2 | 7/2015 | Kudo | |
| 9,649,844 | B2 | 5/2017 | Shirono | |
| 10,384,455 | B2 | 8/2019 | Shirono | |
| 10,792,928 | B2 | 10/2020 | Shirono | |
| 2004/0061750 | A1 | 4/2004 | Cho et al. | |
| 2010/0053279 | A1 | 3/2010 | Tamaki | |
| 2011/0164086 | A1 * | 7/2011 | Ggoto | B41M 5/0017 524/558 |
| 2011/0310184 | A1 * | 12/2011 | Nakamura | B41J 2/17513 347/85 |
| 2014/0104349 | A1 * | 4/2014 | Kimura | B41J 2/17553 347/85 |
| 2015/0224782 | A1 | 8/2015 | Nakamura et al. | |

FOREIGN PATENT DOCUMENTS

| | | | | | |
|---|---|---|---|---|---|
| JP | 9-234881 | A | 9/1997 | |
| JP | 2000-000975 | A | 1/2000 | |
| JP | 2003237096 | * | 8/2003 | B41J 3/04 |
| JP | 2007-1210 | A | 1/2007 | |
| JP | 2011-240707 | A | 12/2011 | |

OTHER PUBLICATIONS

International Search Report and the Written Opinion of International Application No. PCT/JP2016/000228, dated May 24, 2016.
Notice of Reasons for Rejection of related Japanese Patent Application No. 2015-008171, dated Aug. 14, 2018.

* cited by examiner

TANK

CROSS REFERENCE TO RELATED APPLICATION

This application is a continuation of U.S. patent application Ser. No. 17/062,829, filed Oct. 5, 2020, now U.S. Pat. No. 11,396,186, which is a continuation of U.S. patent application Ser. No. 16/543,206, filed Aug. 16, 2019, now U.S. Pat. No. 10,792,928, which is a continuation of U.S. patent application Ser. No. 15/952,662, filed Apr. 13, 2018, now U.S. Pat. No. 10,384,455, which is a continuation of U.S. patent application Ser. No. 15/595,238, filed May 15, 2017, now U.S. Pat. No. 9,944,085, which is a continuation of U.S. patent application Ser. No. 14/996,617, filed Jan. 15, 2016, now U.S. Pat. No. 9,649,844, all of which further claim priority from Japanese Patent Application No. 2015-008171 filed on Jan. 19, 2015, the disclosure of all of which are incorporated herein by reference in their entirety.

BACKGROUND

Field of the Invention

The present invention relates to a tank used for a liquid consuming part of an ink-jet printer or the like.

Description of the Related Art

There has been conventionally known, as an exemplary liquid consuming apparatus, a printer including a capacious tank which can be replenished with ink and a recording head which discharges the ink supplied from the tank through nozzles to record letters, an image, and the like on a recording sheet. The tank includes an ink inlet which is opened and closed by a cap. Removing the cap from the inlet allows the tank to be refilled with the ink through the inlet. The tank includes a view wall with an alarm line (a replenishment-start line) for alerting a shortage of the ink to a user, the view wall being a vertical wall used for checking a remaining amount of ink in the tank. A user refills the tank with the ink when a liquid level of ink in the tank fails to reach a position indicated by the replenishment-start line.

SUMMARY

The replenishment-start line, however, is provided at a lower part of the view wall near the bottom surface of a liquid chamber of the tank. Thus, when ink is remained at a corner between an inner surface of the view wall and the bottom surface of the liquid chamber by surface tension in a state that the liquid amount of ink in the tank is substantially zero, a liquid level of the ink may look as if it were above the replenish start line. As a result, the user can not know that the liquid amount of ink is substantially zero, and thus the user may miss the timing to refill the tank with the ink.

Missing the ink supply timing causes air to enter a tube through which the ink is supplied from the tank to the recording head. This may cause printing failure, temporary interruption of printing, or the like.

In view of the above, an object of the present teaching is to provide a tank which allows a user to know a remaining amount of liquid in the tank at appropriate timing.

According to an aspect of the present teaching, there is provided a tank configured to store a liquid, including:

a liquid storage chamber;

a wall defining the liquid storage chamber, the wall including a view wall and a bottom wall, the view wall having transparency or translucency so that a liquid level in the liquid storage chamber is visible, the view wall extending in an up-down direction, and the bottom wall being connected to the view wall to define an inner bottom surface of the liquid storage chamber;

an inlet penetrating the wall; and a liquid outflow part configured to allow the liquid to flow to the outside of the liquid storage chamber, wherein the inner bottom surface of the bottom wall includes an inclined surface which is formed in at least a part of the bottom wall connected to the view wall, and which extends downward in a direction away from the view wall; and the liquid outflow part is positioned below a boundary between the inclined surface and the view wall.

In this configuration, when the liquid is consumed in a state that the liquid level in the liquid storage chamber fails to reach the upper end of the inclined surface connected to the view wall, the liquid moves or flows downward in the direction away from the view wall. Thus, the liquid is prevented from remaining at the inner surface of the view wall, and the user can know the decrease in liquid at appropriate timing. Accordingly, the user can perform liquid replenishment at appropriate timing.

The present teaching can prevent the liquid from remaining at the inner surface of the view wall when the liquid in the liquid storage chamber is consumed or reduced. This allows the user to appropriately know the decrease in liquid, thereby making it possible to stably replenish the liquid storage chamber with the liquid at appropriate timing.

BRIEF DESCRIPTION OF THE DRAWINGS

FIGS. 1A and 1B are exemplary schematic views of an ink-jet printer including a tank according to an embodiment of the present teaching, wherein FIG. 1A depicts a state in which a cover is closed, and FIG. 1B depicts a state in which the cover is open.

DESCRIPTION OF THE EMBODIMENTS

Figure 1A:
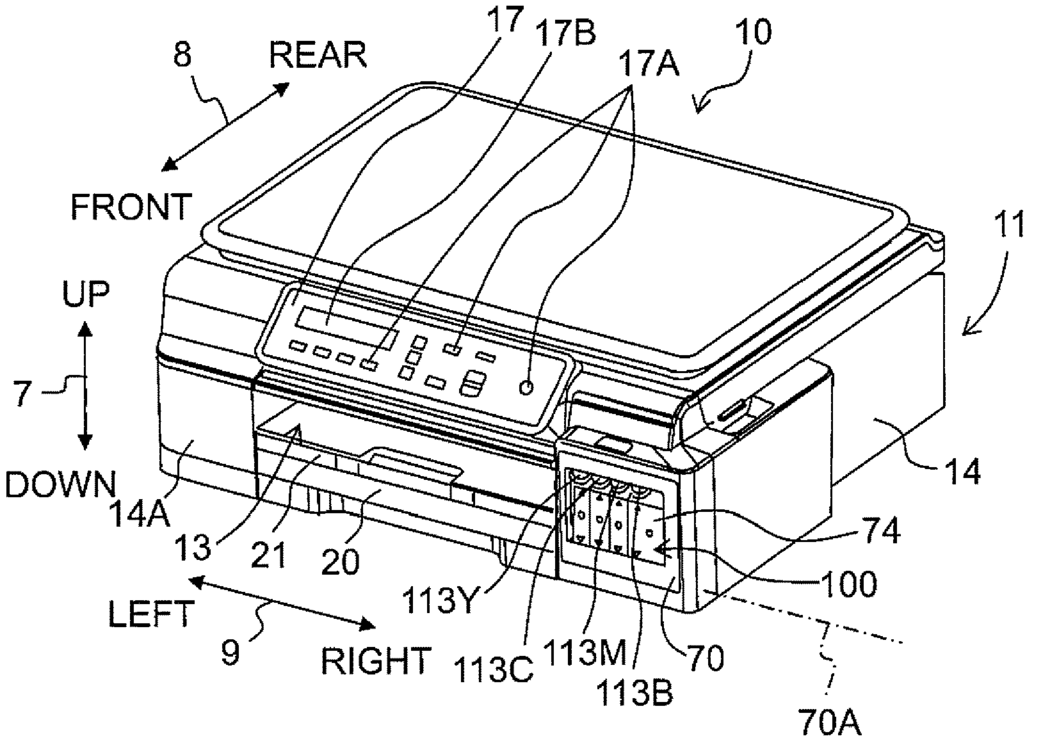

An explanation will be made about an embodiment of the present teaching with reference to drawings. In the embodiment, a liquid consuming apparatus is exemplified by an ink-jet multifunctional printer 10 (hereinafter also referred to simply as "multifunction peripheral 10"). The multifunction peripheral 10 in this embodiment has various functions such as a facsimile function and a print function. In this specification and claims, an up-down direction is coincident with an up-down direction 7 of the multifunction peripheral 10 depicted in FIG. 1. Similarly, a front-rear direction and a left-right direction in the specification and claims are respectively coincident with a front-rear direction 8 and a left-right direction 9 of the multifunction peripheral 10 depicted in FIG. 1. The embodiment to be explained below is merely an example of the present teaching, and it is needless to say that the embodiment of the present teaching can be changed or modified appropriately without departing from the gist and scope of the present teaching.

<Overall Structure of Multifunction Peripheral 10>

Figure 1B:
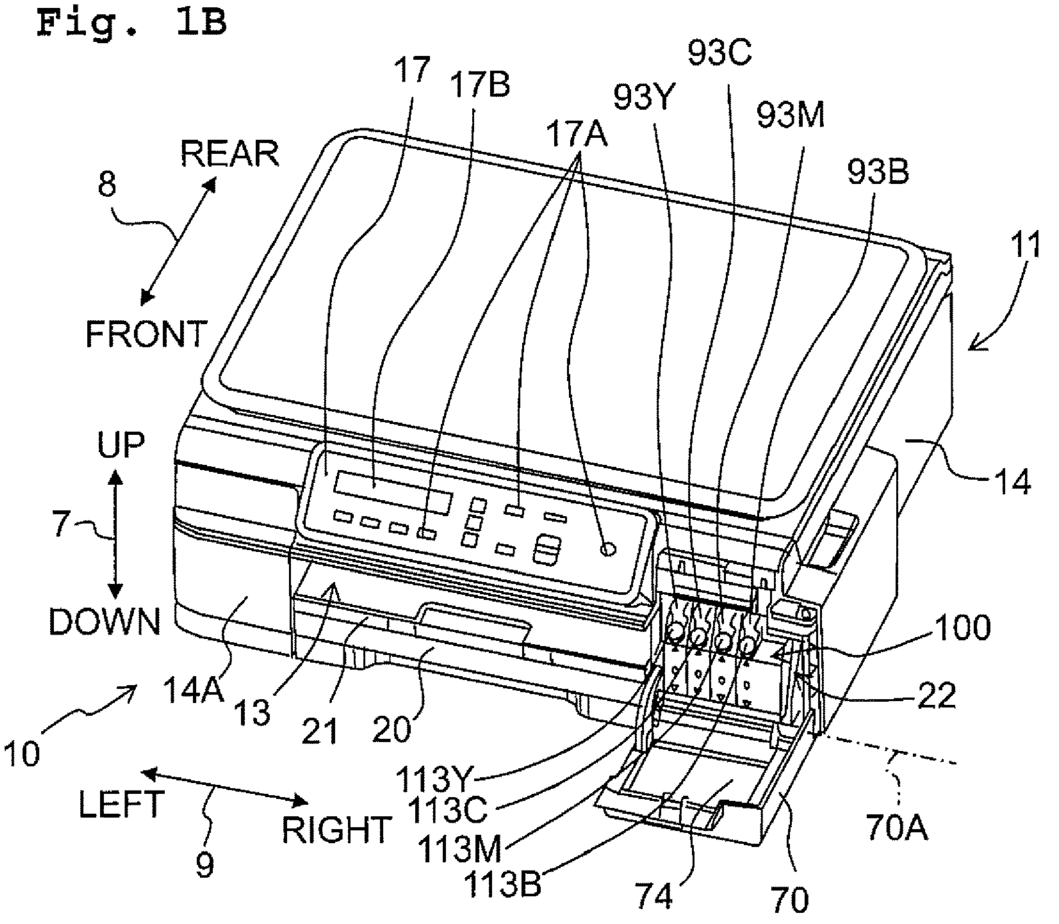

As depicted in FIGS. 1A and 1B, the multifunction peripheral 10 has a substantially rectangular parallelepiped form. The multifunction peripheral 10 includes a printer unit 11 in its lower part. The printer unit 11 records letters, an image, and the like on a sheet 12 (see FIG. 2) in accordance with an ink-jet recording system. An opening 13 is provided in a front wall 14A of a housing 14 of the printer unit 11 in the center in the left-right direction 9. An operation panel 17 is provided above the opening 13. The operation panel 17 includes input buttons 17A and a liquid crystal display 17B.

The opening 13 includes a feed tray 20 and a discharge tray 21. A user inserts or removes the feed tray 20 into or from the multifunction peripheral 10 in the front-rear direction 8. The feed tray 20 accommodates sheets 12 stacked thereon. The discharge tray 21 is positioned above the feed tray 20.

A tank 100 storing inks is provided in a right front part of the housing 14. The tank 100, which is accommodated in the housing 14, is fixed to the housing 14 so that no user can easily remove the tank 100 from the housing 14.

The front surface of the tank 100 is exposed to the outside of the multifunction peripheral 10 via an opening 22, which is formed in the front wall 14A of the housing 14. The housing 14 is provided with a cover 70 which is swingable between a closed position (see FIG. 1A) where the cover 70 covers the opening 22 and an open position (see FIG. 1B) where the opening 22 is exposed. The external form and size of the cover 70 correspond to the opening 22.

The cover 70 is supported by the housing 14 so that a lower part of the cover 70 is swingable around a swing axis 70A extending in the left-right direction 9. The cover 70 in the closed position covers the front part of the tank 100 to form a part of the front wall 14A of the housing 14. The cover 70 in the open position exposes the front part of the tank 100 to the outside of the housing 14.

As depicted in FIG. 1A, the cover 70 includes a window 74 in the center of its front surface. The window 74 allows light to pass therethrough. The window 74 is formed, for example, of a transparent material which is placed or embedded in the opening to make visible light pass. The window 74 has such a size that the user can visually check the front part of the tank 100 in the up-down direction 7.

The window 74 may not be formed of the transparent material allowing visible light to pass. For example, the window 74 may be formed only of the opening. In such a case, it is preferred that the window 74 have such a size that the user, who sees the front part of the tank 100 from the outside with the cover 70 closed, can check a remaining amount of ink, as will be described later.

<Printer Unit 11>

Figure 2:
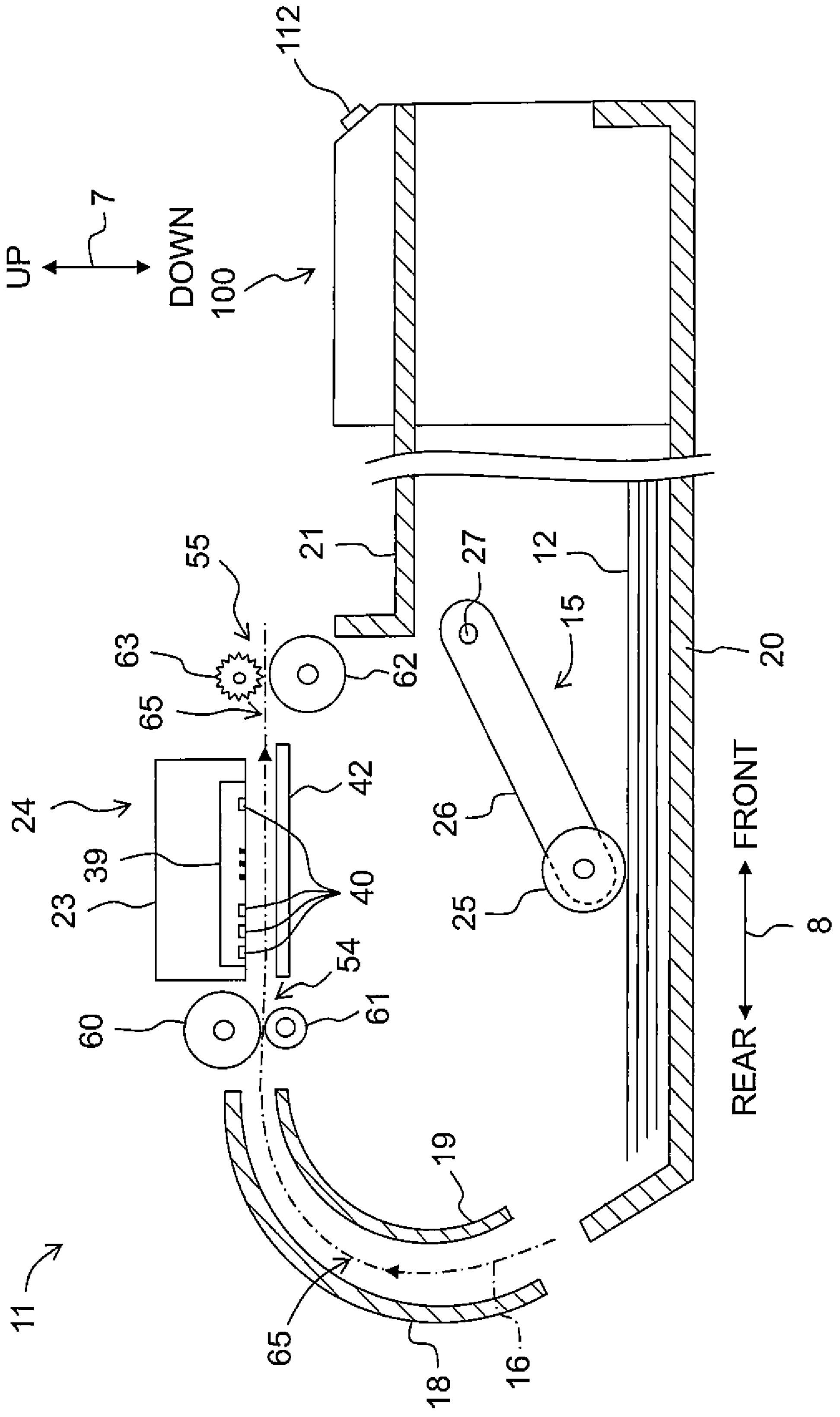
FIG. 2 is a vertical cross-sectional view schematically depicting an internal structure of a printer unit.

As depicted in FIG. 2, the printer unit 11 includes the feed tray 20 accommodating sheets 12, a feed unit 15 feeding the sheet 12 in the feed tray 20, a conveyance roller unit 54 feeding the sheet 12 fed from the feed unit 15 to a recording unit (liquid consuming unit) 24, the recording unit 24 recording letters, an image, and the like on the sheet 12, a discharge roller unit 55 discharging the sheet 12 for which recording has been performed by the recording unit 24, and the discharge tray 21 receiving the sheet 12 discharged from the discharge roller unit 55.

The feed unit 15 includes a feed roller 25, a feed arm 26, and a shaft 27. The front end of the feed arm 26 rotatably supports the feed roller 25. A conveyance motor (not depicted) rotates the feed roller 25 to feed the sheet 12 in a sheet conveyance direction 16. The shaft 27, which is supported by a frame of the printer unit 11, pivotably or swingably supports the feed arm 26. An elastic force caused by a spring or a weight of the feed arm 26 biases the feed arm 26 so that the feed arm 26 swings toward the feed tray 20. The feed unit 15 feeds each sheet 12 accommodated in the feed tray 20 to a conveyance path 65.

The conveyance path 65 extends from the rear end of the feed tray 20 toward the rear side of the printer unit 11, extends from the lower side to the upper side in the up-down direction 7 on the rear side of the printer unit 11 while being curved to make a U-turn, and passes through the space between the recording unit 24 and the platen 42 to arrive at the discharge tray 21. The rear end of the feed tray 20 and a space formed by an outer guide member 18 and an inner guider member 19 which face each other while being separated by a predetermined interval constitute a part of the conveyance path 65 through which the sheet 12 is conveyed to the recording unit 24. The arrows using dashed-dotted lines in FIG. 2 indicate the sheet conveyance direction 16 of the sheet 12 in the conveyance path 65. The conveyance path 65 is provided in the center of the multifunction peripheral 10 in the left-right direction 9.

The conveyance roller unit 54 is disposed on the upstream side of the recording unit 24 in the sheet conveyance direction 16. The conveyance roller unit 54 includes a conveyance roller 60 and a pinch roller 61 facing each other. The conveyance roller 60 is driven by an unillustrated conveyance motor. The pinch roller 61 is driven to rotate accompanying with the rotation of the conveyance roller 60. The sheet 12 is conveyed in the sheet conveyance direction 16 while being held or nipped by the conveyance roller 60 and the pinch roller 61.

The recording unit 24 includes a carriage 23 and the platen 42 facing each other in the up-down direction 7 with the conveyance path 65 intervening therebetween. The carriage 23 includes the recoding head 39. The recording head 39 includes nozzles 40 in its lower surface. Ink is supplied from the tank 100 to the recording head 39. The recording head 39 discharges the ink as fine ink droplets through the nozzles 40. Namely, the recording head 39 discharges ink droplets onto the sheet 12, which is being supported by the platen 42 from the lower side, during movement of the carriage 23. Accordingly, letters, an image, and the like are recorded on the sheet 12.

The discharge roller unit 55 is disposed on the downstream side of the recording unit 24 in the sheet conveyance direction 16. The discharge roller unit 55 includes a discharge roller 62 and a spur roller 63 facing each other. The discharge roller 62 is driven by a conveyance motor (not depicted). The spur roller 63 is driven to rotate accompanying with the rotation of the discharge roller 62. The sheet 12 is conveyed in the sheet conveyance direction 16 while being held or nipped by the discharge roller 62 and the spur roller 63. The sheet 12, which has passed through the discharge roller unit 55, is discharged on the upper part of the discharge tray 21.

<Tank 100>

Figure 3:
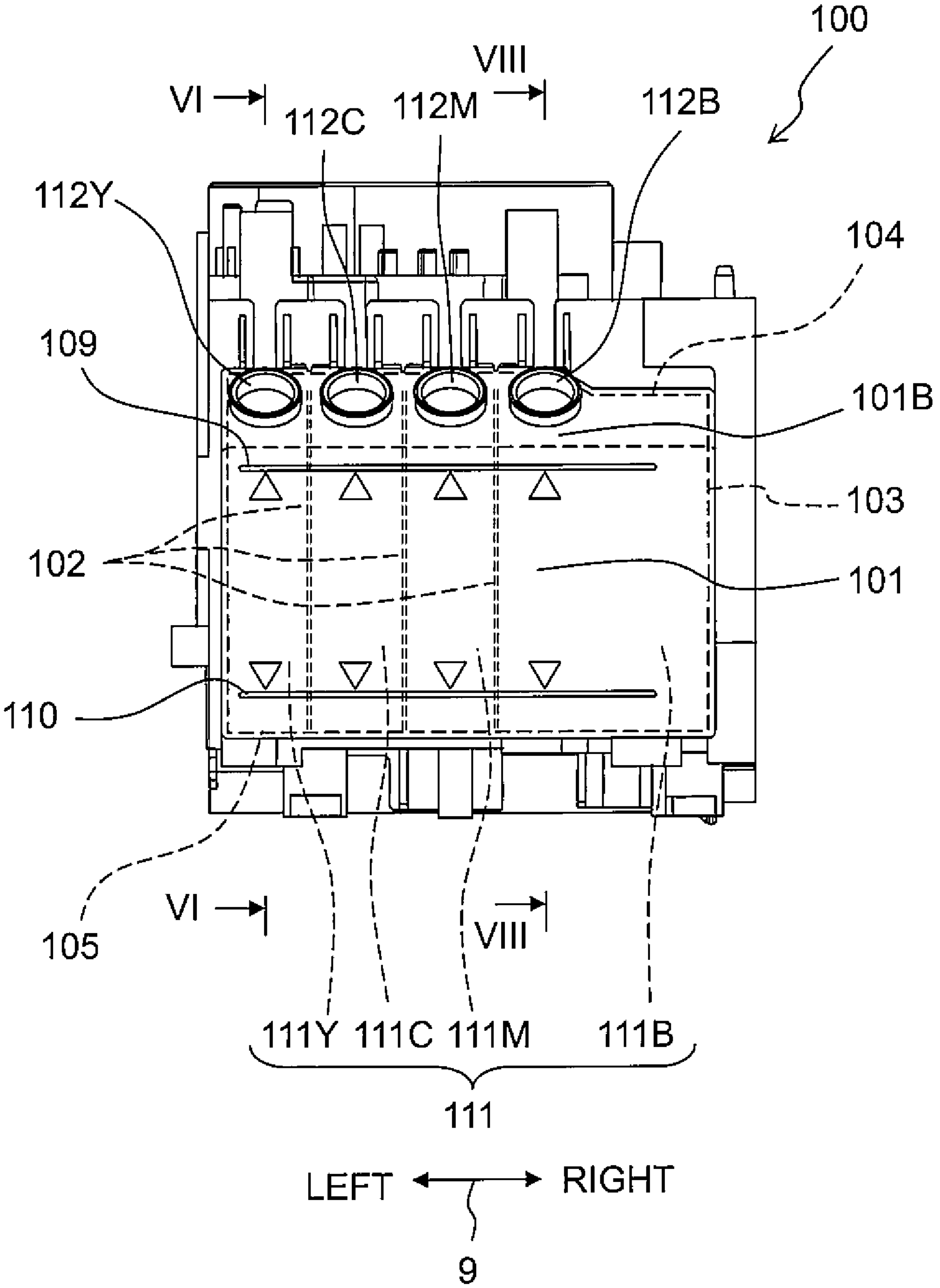
FIG. 3 is a front view of the tank according to the embodiment of the present teaching.

As depicted in FIGS. 1A, 1B, and FIG. 3, the tank 100 has a substantially rectangular parallelepiped form. The tank 100 includes walls separating ink chambers 111 from the outside. The walls include a view wall 101 as its front surface. The view wall 101 extends upward and downward to allow the user to visually check a liquid level of each ink. Further, the walls include a second side wall 103 connected to the view wall 101 to define a side surface which extends in a direction intersecting with the view wall 101; an upper wall 104 connected to the view wall 101 to define the upper surface of the ink chambers 111; and a bottom wall 105 defining an inner bottom surface 105A (FIGS. 6 and 8) of the ink chambers 111.

The internal space of the tank 100 according to this embodiment is divided into four spaces in the left-right direction 9 to define four ink chambers 111B, 111M, 111C, and 111Y disposed adjacently to each other. Each of the four ink chambers 111B, 111M, 111C, and 111Y is an exemplary liquid storage chamber. The alphabetic suffixes of B, M, C, and Y show ink colors respectively. The ink chambers 111B, 111M, 111C, and 111Y will be described collectively as "ink chambers 111" in some cases.

First side walls 102 partition between the ink chambers 111B and 111M, between the ink chambers 111M and 111C, and between the ink chambers 111C and 111Y, respectively. This configuration forms the spaces of the ink chambers 111B, 111M, 111C, and 111Y. The rear surface of the tank 100 is sealed (closed) by welding a film 120 (FIG. 4) to the rear end surfaces of the first side walls 102, the second side wall 103, the upper wall 104, and the bottom wall 105.

The ink chamber 111B contains black ink, the ink chamber 111M contains magenta ink, the ink chamber 111C contains cyan ink, and the ink chamber 111Y contains yellow ink. Each of the inks is an exemplary liquid. The number of ink chambers 111 and ink colors are not limited to the above examples. Of the four ink chambers 111B, 111M, 111C, and 111Y, the ink chamber 111B is disposed on the right most side, and the ink chamber 111Y is disposed on the left most side. The ink chamber 111B has a capacity larger than those of other ink chambers 111M, 111C, and 111Y.

An inclined wall 101B includes the corners of the view wall 101 and the upper wall 104. Further, the inclined wall 101B includes inlets 112B, 112M, 112C, and 112Y through which the inks are poured into the ink chambers 111B, 111M, 111C, and 111Y respectively. The inlets 112B, 112M, 112C, and 112Y will be described collectively as "inlets 112" in some cases.

The inlets 112 penetrate the inclined wall 101B of the tank 100 in its thickness direction to allow the ink chambers 111 corresponding thereto respectively to communicate with the outside of the tank 100. In this embodiment, the inlets 112 are formed in the inclined wall 101B of the tank 100. The inlets 112 face outward and obliquely upward when fixed to the housing 14. Namely, the inlets 112 open into the inclined wall 101B in a direction parallel to an axis L (FIG. 5), which inclines to the up-down direction 7 and the front-rear direction 8.

In this embodiment, the view wall 101 of the tank 100 includes an ink replenishment line 110. The ink replenishment line 110 lets the user know the timing for replenishing the tank 100 with ink. For example, the ink replenishment line 110 can be provided at a position indicating that a remaining amount of ink in each ink chamber 111 is 15-25% of the capacity of each ink chamber 111. Alternatively, the ink replenish line 110 of the tank 100 is positioned, for example, at the same height as a position where the view wall 101 is connected to an inclined part 106 as will be described later. The ink replenish line 110 may be a mark or a seal which is put on the view wall 101 of the tank 100 to indicate the ink replenish line. The ink replenishment line 110 may be formed in the cover 70 of the multifunction peripheral 10. The view wall 101 also includes an ink full-amount line 109 in its upper part. The colors of inks and the like may be indicated, for example, by putting colored marks or seals on the tank 100 or indicating colors of inks on the cover 70.

As depicted in FIG. 1B, the inlets 112 of the tank 100 are exposed to the outside of the multifunction peripheral 10 through the opening 22 in a state that the cover 70 is in the open position. Removable Caps 113B, 113M, 113C, and 113Y are respectively provided to the inlets 112B, 112M, 112C, and 112Y (FIG. 3). The caps 113B, 113M, 113C, and 113Y will be referred to collectively as "caps 113" in some cases. Removing the cap 113 from the inlet 112 in a state that the cover 70 supported by the housing 14 is in the open state opens the inlet 112. The ink can be poured into the ink chamber 111 through the inlet 112.

The tank 100 according to this embodiment is formed of a translucent or transparent resin. The inlets 112 are provided in the inclined wall 101B, which is an upper part of the view wall 101. Thus, the user can replenish the tank 100 with the ink from the inlet 112 while visually checking a liquid level through the view wall 101. This enables the user to easily replenish the tank 100 with an appropriate amount of ink.

<Cap 113>

Figure 4:
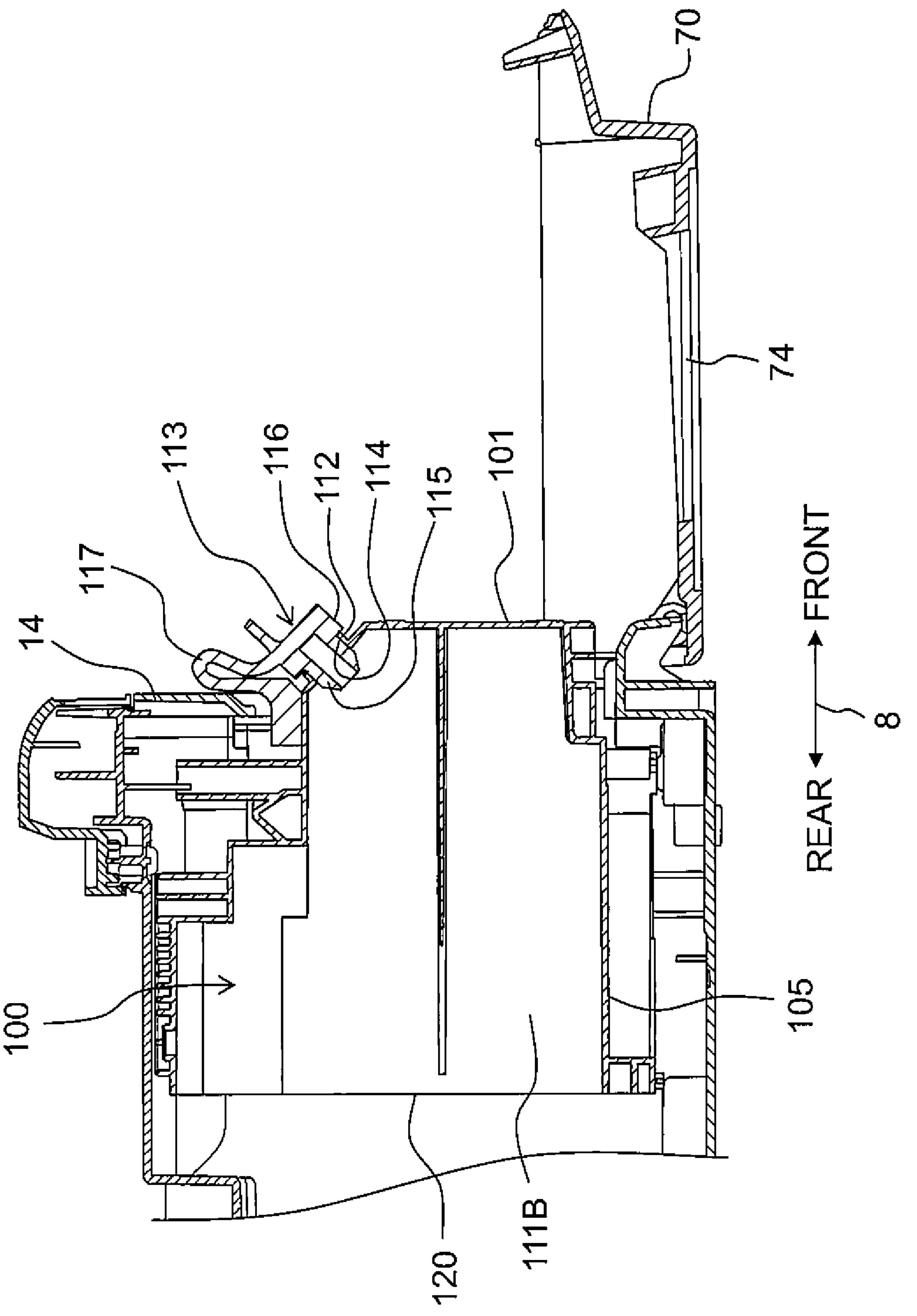
FIG. 4 is a vertical cross-sectional view depicting a state in which the cover is open and a cap closes the inlet of the tank.

As depicted in FIG. 4, the cap 113 fitted in the inlet 112 closes the inlet 112 by being brought into tight contact therewith. The caps 113B, 113M, 113C, and 113Y have the same shape. In the following, detailed configuration will be explained by using the collective term "caps 113".

The caps 113 each include a first part 115 and a second part 116. The first part 115, which has a columnar shape, is inserted into a path 114 of the inlet 112 to close the path 114. The second part 116, which has a large-diameter columnar shape, is formed continuously to the first part 115 and is positioned outside the inlet 112. The second part 116 includes an arm 117 having a first end connected to a part, of the second part 116, which is deviated from the center of the second part 116. A second end of the arm 117 is inserted or supported between an upper part of the tank 100 and the housing 14. Thus, the cap 113 is fixed between the tank 100 and the housing 14 in a state of being prevented from being removed easily. The cap 113 is formed of an elastically deformable material such as rubber and elastomer.

Closing the inlet 112 with the first part 115 of the cap 113 as depicted in FIG. 4 causes the arm 117 to bend or curve upward, that is, to have a convex-like shape. When the ink in each ink chamber 111 of the tank 100 becomes insufficient by being consumed, the user pivotably moves the cover 70 from the closed position to the open position so as to access the inlet 112 of the tank 100 through the opening 22 of the housing 14 (the state depicted in FIG. 4).

Figure 5:
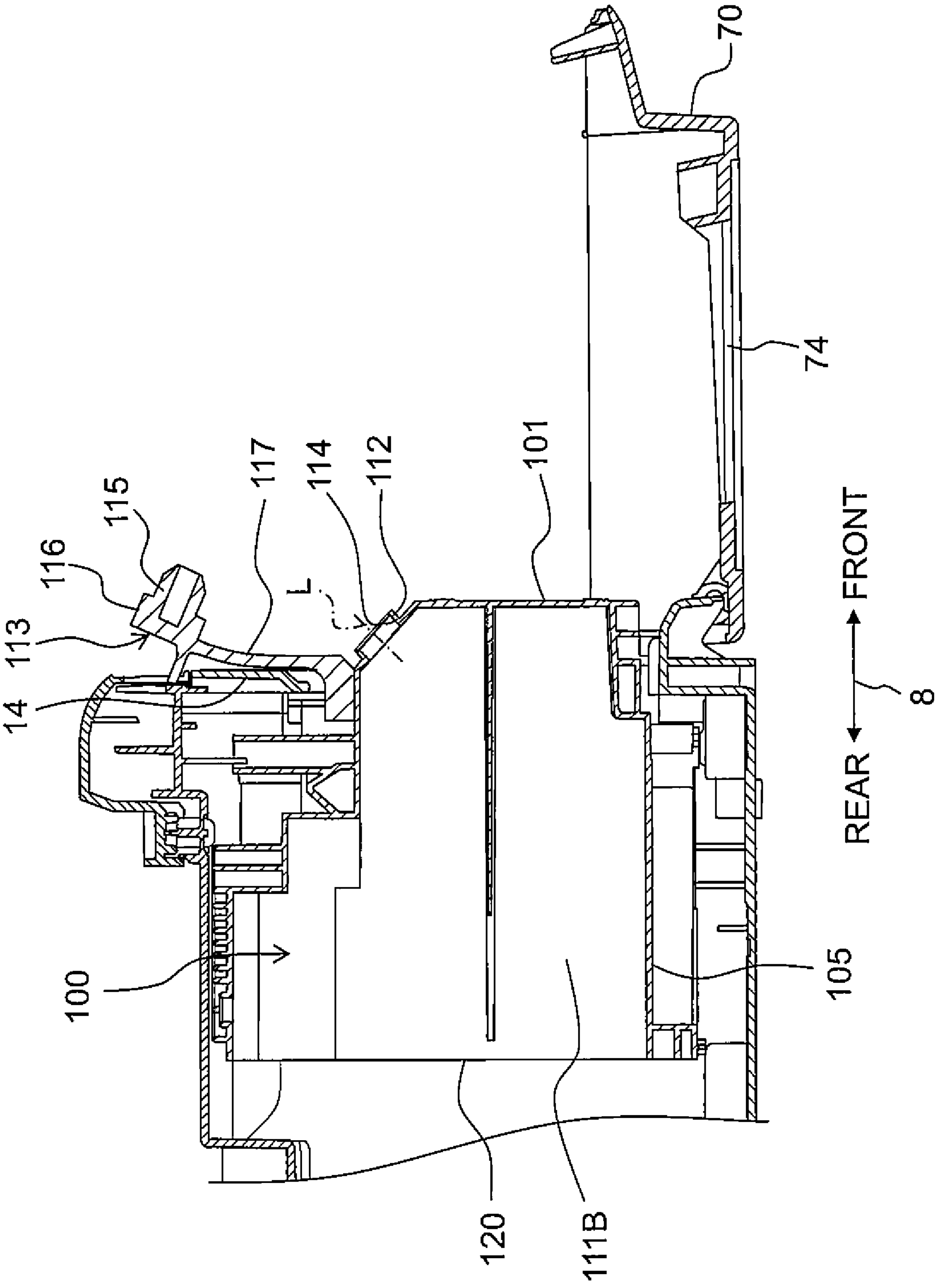
FIG. 5 is a vertical cross-sectional view depicting a state in which the cover is open and the cap is removed from the inlet of the tank.

Then, the user removes the first part 115 and the second part 116 of the cap 113 from the inlet 112, as depicted in FIG. 5. The first part 115 and the second part 116 removed from the inlet 112 stand and extend upward by the aid of the elastic force of the arm 117, thus forming a space around the inlet 112. Opening the inlet 112 in such a manner enables the user to replenish the ink chamber 111 with the ink through the inlet 112.

When completing the ink replenishment, the user seals the inlet 112 by inserting the first part 115 of the cap 113 into the inlet 112 (the state depicted in FIG. 4). After that, the user pivotably moves the cover 70 from the open position to the closed position (the state depicted in FIG. 1A).

<Ink Chambers 111>

Figure 6:
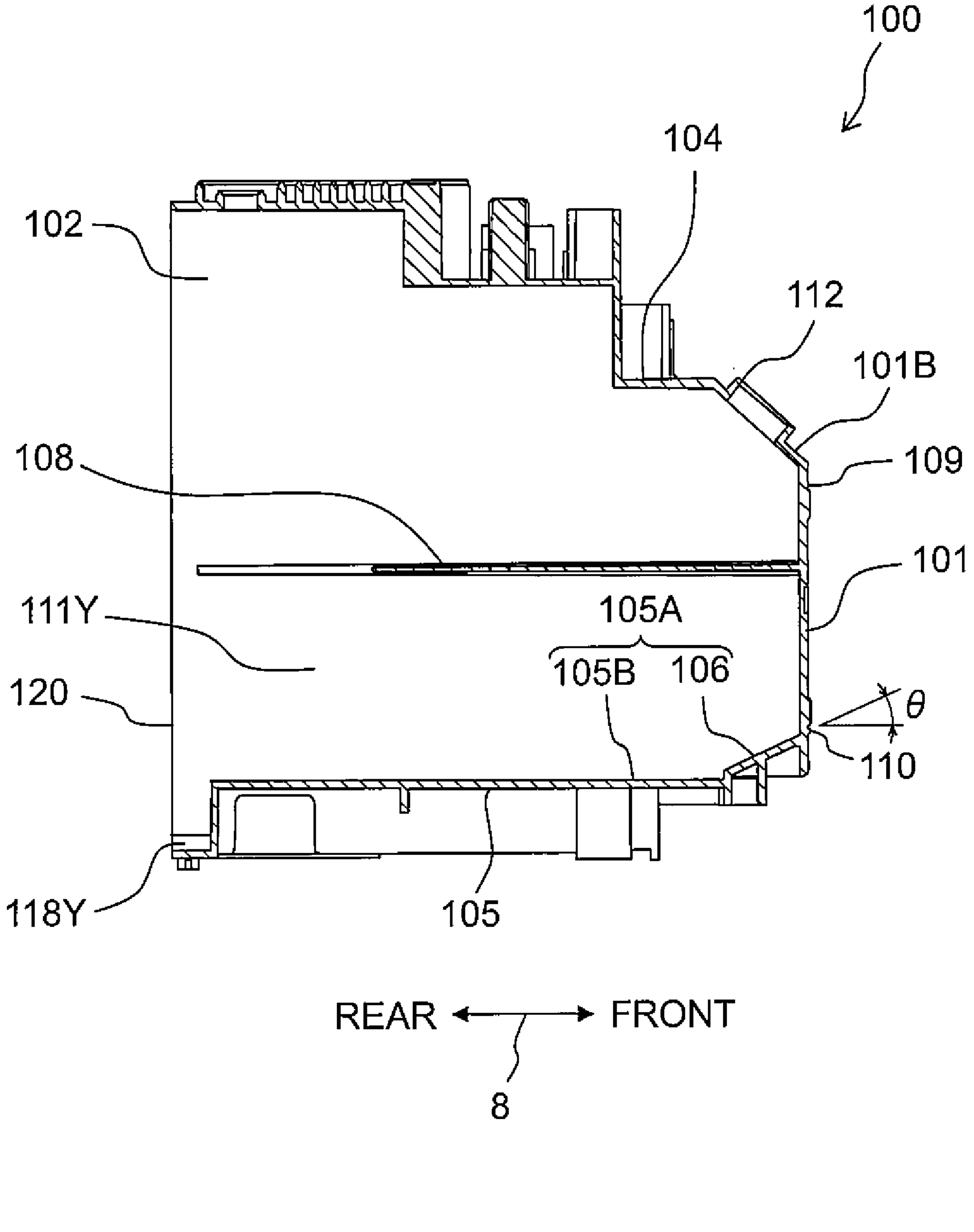
FIG. 6 is a cross-sectional view taken along the arrow VI-VI in FIG. 3.

Subsequently, the ink chambers 111 will be explained with reference to FIG. 6. FIG. 6 depicts a cross-section of the ink chamber 111Y having the same internal space as those of the ink chambers 111M and 111C. The ink chambers 111M, 111C, and 111Y have the same structure, and thus any explanation of the ink chambers 111M and 111C will be omitted.

The ink chamber 111Y is a space defined by the view wall 101, the upper wall 104, the bottom wall 105, the first side wall 102 and second side wall 103 which extend in a direction intersecting with these walls 101, 104, and 105 to define side surfaces (FIG. 3), and the film 120 to be putted on the rear end surface of the ink chamber 111Y. The example depicted in FIG. 6 includes a buffer wall 108 which extends in a horizontal direction at an intermediate part in the up-down direction 7. The ink poured from the inlet 112 formed in the inclined wall 101B falls onto the buffer wall 108 to reduce the speed of ink current or flow, and then falls downward from buffer wall 108 in the ink chamber 111Y.

An ink outflow part 118Y through which the ink flows is formed at the rear lower end of the ink chamber 111Y. The ink outflow part 118Y extends to the outer surface of the second side wall 103 disposed on the right end of the tank 100. The ink chambers 111B, 111M, and 111C include ink outflow parts 118B, 118M, and 118C through which the inks stored in the ink chambers 111B, 111M, and 111C flow from the tank 100 to the recording unit 24.

The inclined part 106, which is connected to the inner surface of the view wall 101, is a part of the inner bottom surface 105A of the bottom wall 105 of the ink chamber 111Y. The inclined part 106 extends from the connection point with the inner surface of the view wall 101 to incline downward and rearward. In other words, the inclined part 106 of the bottom wall 105 forms an obtuse angle with the inner surface of the view wall 101 extending in the up-down direction 7. A lowermost part 105B horizontally extends rearward from the rear end of the inclined part 106. Namely, the inclined part 106 of the inner bottom surface 105A according to this embodiment extends from the inner surface of the view wall 101 to the lowermost part 105B. Similar to the ink chamber 111Y, each of the ink chambers 111M and 111C includes the bottom wall 105 having the inner bottom surface 105A provided with the inclined part 106 and the lowermost part 105B. Although a step between the inclined part 106 and the lowermost part 105B is formed in this embodiment, the inclined part 106 may be formed continuously to the lowermost part 105B without the step.

Figure 7:
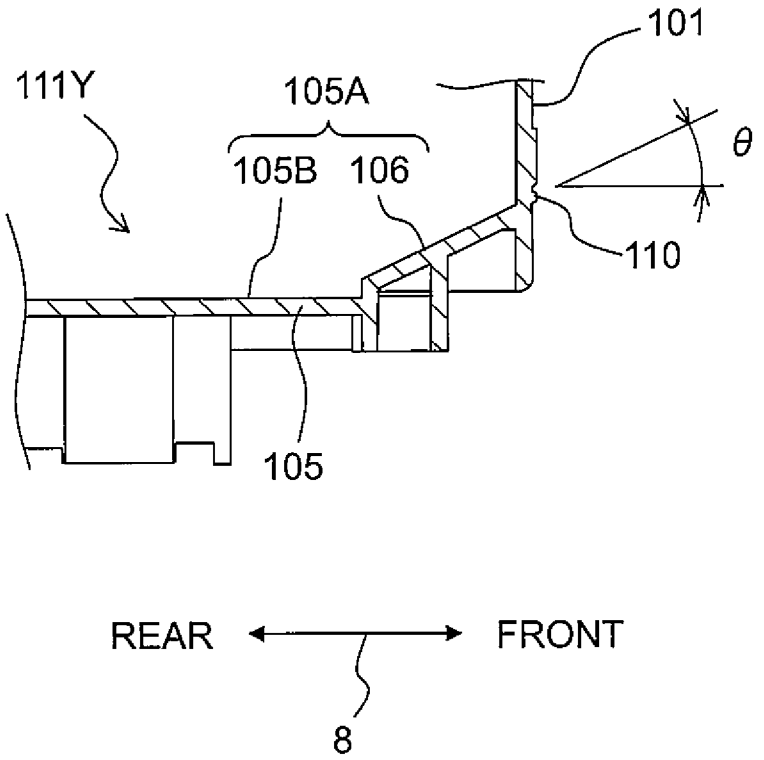
FIG. 7 is an enlarged cross-sectional view of an area around an inclined part depicted in FIG. 6.

As depicted in FIG. 7, the view wall 101 includes the ink replenishment line 110 on its outer surface. The inclined part 106, which is connected to the inner surface of the view wall 101 at a position at which the ink replenishment line 110 is provided on the outer surface, extends from the connection point to incline rearward and downward. The inclined part 106 according to this embodiment is formed to have an inclination angle θ of approximately 20 to 25 degrees relative to a horizontal plane.

The inclined part 106, which has an inclination angle θ of at least not less than two degrees relative to the horizontal plane, prevents the ink from remaining at a corner connecting the inner surface of the view wall 101 and the inclined part 106, when the ink is consumed. It is preferred that the inclination angle θ of the inclined part 106 be not less than 10 degrees. The inclined part 106, which has an inclination angle θ of not less than 10 degrees relative to the horizontal plane, further prevents the ink from remaining at the corner. This enables the user to appropriately know that a liquid level of the ink is away from the inner surface of the view wall 101. Even when the multifunction peripheral 10 is set in an slightly inclined state (for example, in a state of being inclined forward), the inclined part 106 prevents the ink from remaining at the corner and enables the user to appropriately know the decrease in ink.

Figure 8:
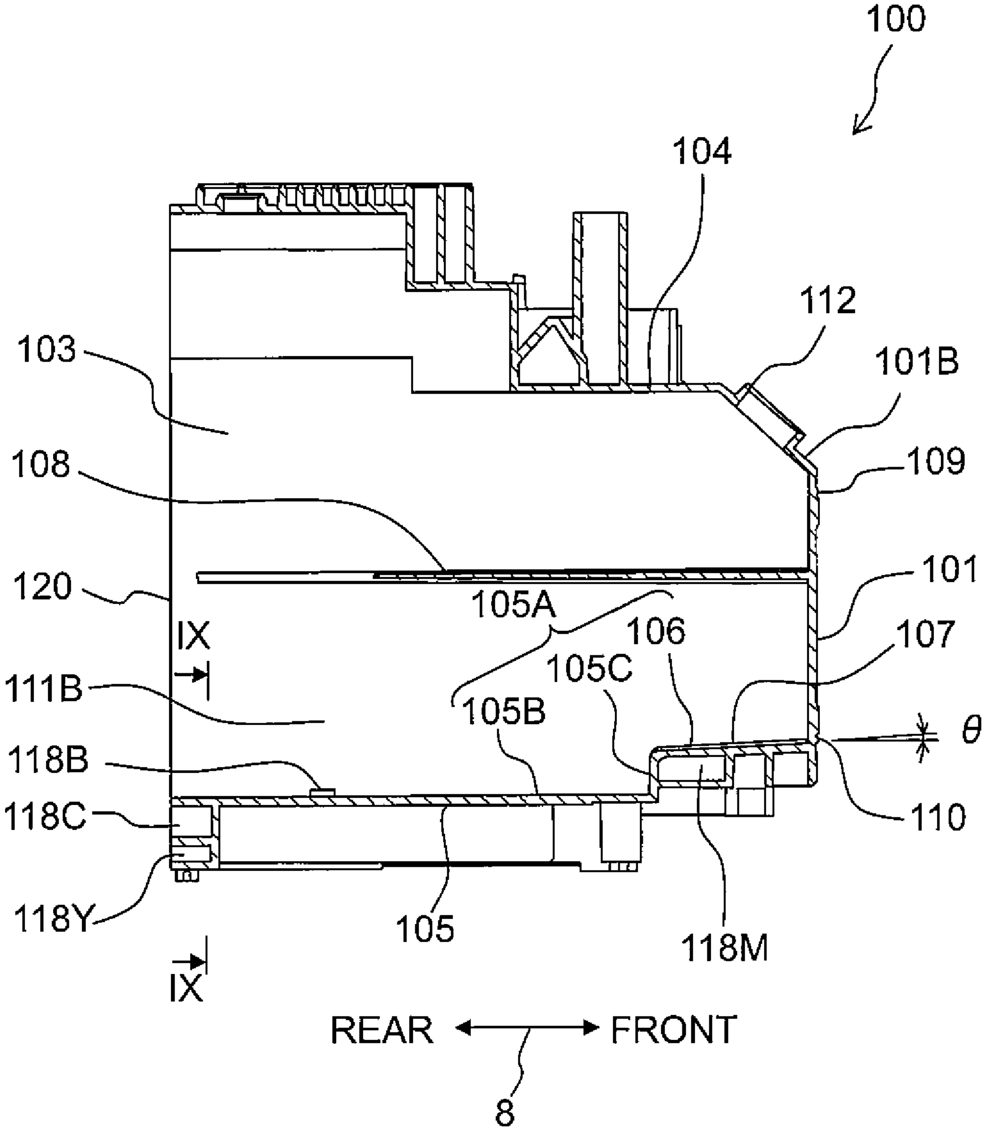
FIG. 8 is a cross-sectional view taken along the arrow VIII-VIII in FIG. 3.

Subsequently, the ink chamber 111B will be explained with reference to FIG. 8. The ink chamber 111B includes the buffer wall 108 which extends in the horizontal direction at an intermediate part in the up-down direction 7. The ink poured through the inlet 112 formed in the inclined wall 101B falls onto the buffer wall 108 to reduce the speed of ink current or flow, and then falls downward from buffer wall 108 in the ink chamber 111B.

Of the four ink chambers, the ink chamber 111B is positioned on the outermost side in the tank 100. The ink chamber 111B has an inclined part different from those of the ink chambers 111Y, 111M, and 111C. In the tank 100 according to this embodiment, the ink outflow parts 118Y, 118C, and 118M of the ink chambers 111Y, 111C, and 111M disposed on the left side of the ink chamber 111B extend in the left-right direction 8 below the ink chamber 111B. Especially, the ink outflow part 118M of the ink chamber 111M is formed on the lower front side of the ink chamber 111B. Thus, the bottom wall 105 of the ink chamber 111B is formed of an inner bottom surface 105A provided with a lowermost part 105B, an inclined part 106, and a step 105C. The lowermost part 105B is formed at a position separated from the view wall 101. The inclined part 106 extends from the inner surface of the view wall 101 to incline downward and rearward. The step 105C connects the inclined part 106 and the lowermost part 105B. The lowermost part 105B is disposed below the inclined part 106. Since the ink outflow part 118M is formed on the lower side of the ink chamber 111B, the inclined part 106 has a gentle inclination angle θ, for example, about 2 to 5 degrees. The space for the ink outflow part 118M extending from the ink chamber 111M can be made below the inclined part 106 of the ink chamber 111B of the tank 100 by making the inclination angle θ of the inclined part 106 gentle and providing the step 105C which connects the inclined part 106 and the lowermost part 105B. The ink outflow part 118B of the ink chamber 111B is provided at a position between the inclined part 106 and the lowermost part 105B in the up-down direction 7.

The inclined part 106 includes grooves 107 extending downward from the connection point with the view wall 101 to the step 105C. An end, of each groove 107, on the opposite side to the view wall 101 is open. The grooves 107 generate capillarity, which allows the ink to flow from the inclined part 106 to the step 105C when the ink is consumed, so that no ink remains at the boundary between the view wall 101 and the inclined part 106. Thus, the inclined part 106 having a gentle inclination angle θ can prevent the ink from remaining at the inner surface of the view wall 101. The capillarity generated by the grooves 107 allows the ink to fall onto the lowermost part 105B, thereby making it possible to efficiently concentrate or gather the ink in the ink outflow part 118B disposed between the inclined part 106 and the lowermost part 105B in the up-down direction 7. In order to move the ink toward the lowermost part 105B by the capillarity, it is preferred that the width of each groove 107 be about 0.5 to 1 mm.

Figure 9:
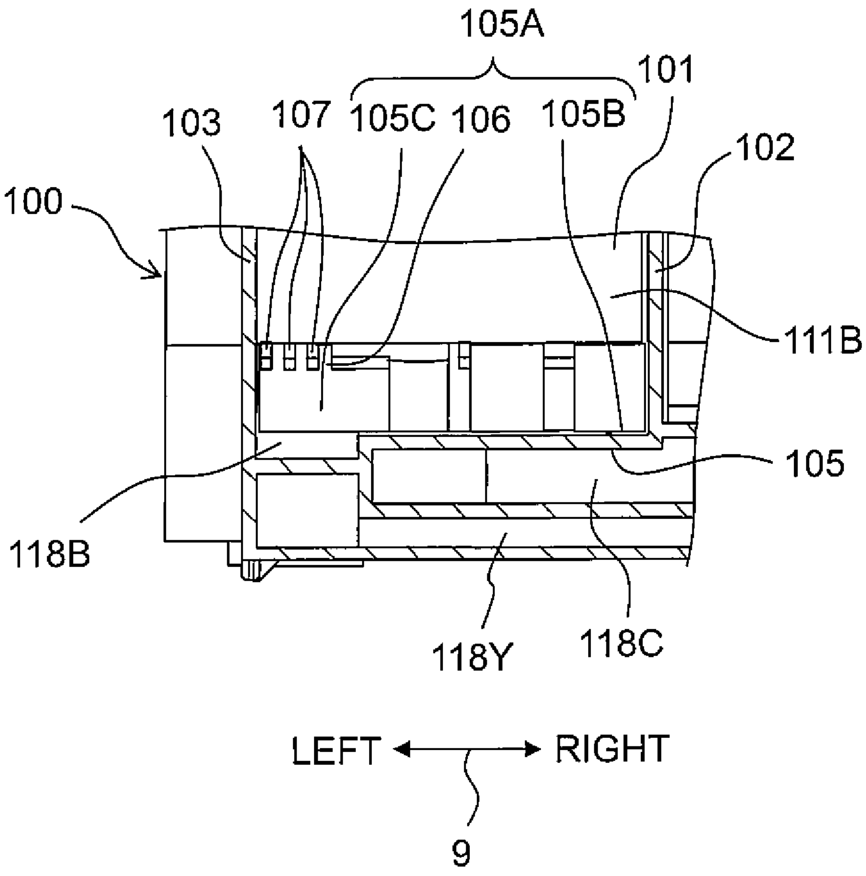
FIG. 9 is a cross-sectional view taken along the arrow IX-IX in FIG. 8.

As depicted in FIG. 9, the grooves 107 are formed at a part, of the ink chamber 111B, close to the second side wall 103. Namely, the grooves 107 are formed at a part (right end in this example), of the inclined part 106, closer to the second side wall 103 than to the center position in a direction intersecting with the second side wall 103.

Accordingly, the ink is prevented from remaining at the inner surface of the view wall 101 of the tank 100 including the ink chambers 111B, 111M, 111C, and 111Y and being configured so that the ink outflow parts 118M, 118C, and 118Y of the ink chambers 111M, 111C, and 111Y pass below the ink chamber 111B. Specifically, the inner bottom surface 105A of the ink chamber 111B is required to have the inclined part 106 and the step 105C to provide the space for the ink outflow part 118M (FIG. 8). The inclined part 106, however, may not be formed over the entire view wall 101 of the ink chamber 111B in the left-right direction 9. In such a case also, the ink is prevented from remaining at the corner of the inner surface of the view wall 101 by providing the inclined part 106 at the position close to the second side wall 103 and providing the grooves 107 in the inclined part 106.

Thus, even the inclined part 106 having a gentle inclination angle θ allows the ink to move or flow downward and to be prevented from remaining at the inner surface of the view wall 101. This is because, the capillarity of the grooves 7 formed near the second side wall 103 works, when the ink in the ink chamber 111B fails to reach the corner formed by the inclined part 106 of the inner bottom surface 105A and the view wall 101. The user can appropriately know that a remaining ink fails to reach the position indicated by the ink replenishment line 110, accordingly.

<Technical Effect of the Embodiment>

According to the tank 100 of this embodiment, when the ink (liquid) stored in the ink chamber (liquid storage chamber) 111 is consumed in a state that the liquid level of ink (liquid) fails to reach the upper end of the inclined part 106 connected to the view wall 101, the ink moves or flows downward along the inclined part 106 in the direction away from the view wall 101. Thus, the tank 100 prevents the ink from remaining at the inner surface of the view wall 101 and enables the user to know the decrease in ink at appropriate timing. Accordingly, the user can replenish the tank 100 with the ink at appropriate timing.

The tank 100 according to this embodiment prevents printing failure and temporary interruption of printing which would be otherwise caused by the decrease in ink. Namely, the tank 100 according to this embodiment results in stable printing.

OTHER EMBODIMENTS

In the above embodiment, the ink is used as an example of liquid. The present teaching, however, is not limited to this. Namely, instead of the ink, the liquid may be a pretreatment liquid which is to be discharged onto a recording sheet before the ink to be jetted at the time of printing, or may be water or the like which is to be sprayed in the vicinity of the nozzles 40 of the recording head 39 for preventing drying of the nozzles 40 of the recording head 39.

In the above embodiment, the tank 100 storing inks of four colors is used as an example. The present teaching, however, is not limited to this. It is possible to use a tank storing a single kind of liquid or a tank storing more kinds of liquids. Such tanks may include the liquid storage chamber(s) corresponding to the number of kinds of liquids.

The shape of the cap 113 may be changed appropriately. For example, instead of the shape insertable into the inlet 112 of the tank 100, the cap 113 may have a shape to be fitted onto a cylindrical projection formed around the inlet 112. Or, the cap 113 may be configured to seal the inlet 112 in such a manner that a male screw formed around the inlet 112 is screwed into a female screw formed in the cap 113.

In the above embodiment, the opening 22 is formed on the right side of the front wall 14A of the housing 14 and the tank 100 is disposed on the rear side of the opening 22. The opening 22, however, may be formed on the left side of the front wall 14A and the tank 100 may be disposed on the rear side of the opening 22. Or, instead of providing the opening 22 in the front wall 14A of the housing 14, the opening 22 may be formed in the right lateral wall or the left lateral wall so that a user can access the inlets 112 of the tank 100 from the right side or the left side.

What is claimed is:

1. An ink-jet printer comprising:
- a casing having a casing front wall, wherein the casing front wall has a first opening and a second opening;
- a feed tray disposed in the first opening; and
- a refillable tank disposed in the casing, wherein the refillable tank is fixed so as not to be removed from the second opening, the refillable tank including:
  - an upper ink chamber;
  - a lower ink chamber;
  - a wall defining the upper ink chamber and the lower ink chamber, the wall comprising a front wall, a rear wall, first side wall and second side wall, the front wall having transparency or translucency, the front and the rear walls extending in an up-down direction and a left-right direction, the first and second side walls extending in the up-down direction and a front-rear direction, wherein an area of the front wall is smaller than an area of each of the side walls, the front wall is exposed from the second opening and the front wall includes a lower limit indicator of the ink; and
- another wall which divides the upper ink chamber and the lower ink chamber and which extends rearward from the front wall at a position above the lower limit indicator of the ink in the up-down direction,
- wherein the upper ink chamber communicates with the lower ink chamber through a communication port formed by the another wall, the communication port being located rearward of an inlet for refilling the tank, and the inlet being accessible through the second opening, and
- wherein, when viewed from the up-down direction, the inlet through which the ink is injected to refill the tank does not overlap the communication port.

2. The ink-jet printer according to claim 1, wherein, when viewed from the up down direction, the communication port does not overlap with an inlet through which ink is injected.

3. The ink-jet printer according to claim 1, wherein the ink injected from an inlet falls on the another wall and then falls from the upper ink chamber to the lower ink chamber.

4. The ink-jet printer according to claim 1, wherein the communication port is separated from the front wall.

* * * * *